Sept. 2, 1952 M. H. MOSELEY 2,608,968
SOLAR HEAT CONVERTER
Filed Oct. 30, 1950

Mortimer H. Moseley
INVENTOR.

BY
Attorneys

Patented Sept. 2, 1952

2,608,968

UNITED STATES PATENT OFFICE 2,608,968

SOLAR HEAT CONVERTER

Mortimer H. Moseley, Eddyville, Ky.

Application October 30, 1950, Serial No. 192,953

6 Claims. (Cl. 126—271)

The invention comprises novel and useful improvements in solar heat converters, and more particularly pertains to improvements in solar heat absorbers.

An important object of this invention is to increase the amount of incident solar radiation absorbed by the heat absorber and to decrease the amount of reflected radiation and emission from the heat absorber.

An important feature of this invention resides in the provision of a diathermanous tube with a plurality of spaced radiant heat absorbing bodies disposed in the tube, the heat absorbing fluid being passed through the tube to cool the radiant heat absorbing bodies and thereby limit the amount of re-radiation from the heat absorber, which heat absorbing fluid further serves to absorb the longer wave length infra-red radiation from the sun.

Another important feature of this invention resides in the provision of a heat absorber, in accordance with the foregoing feature, in which the tube is in the form of a spiral and in which the radiant heat absorbing members are truncated hemispherical shells disposed in axial alignment with said tube so that each of the members disposed in the path of the incident radiation will have a portion of the surface thereof normal to the rays, and consequently reduce the amount of reflected solar radiation.

Still another feature of this invention resides in the provision of a solar heat absorber, in accordance with the foregoing features, in which the truncated hemispherical shells have slots therein to diffuse the heat absorbing fluid as it passes through the members.

Yet another feature of this invention resides in the provision of resilient arms on the members for retaining the same in predetermined adjusted positions in the tube.

These, together with various ancillary objects and features are attained by this device, a preferred embodiment of which has been illustrated, by way of example only, in the accompanying drawings, wherein.

Reference is now made more specifically to the accompanying drawings wherein there is shown the solar heat converter indicated generally by the numeral 10 which includes a heat absorber 12 and a heat exchanger 14.

Figure 1:
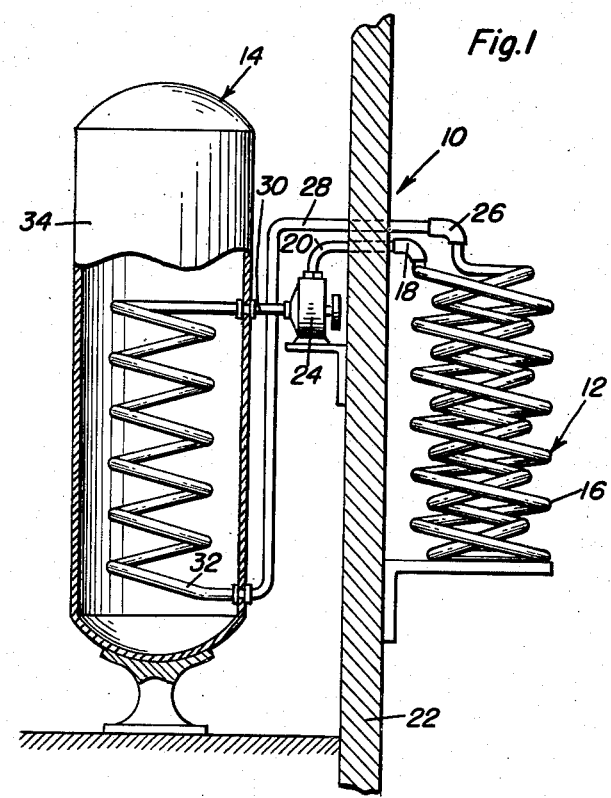
Figure 1 is a fragmentary transverse sectional view of a building having the solar heat converter applied thereto.
Figure 2:
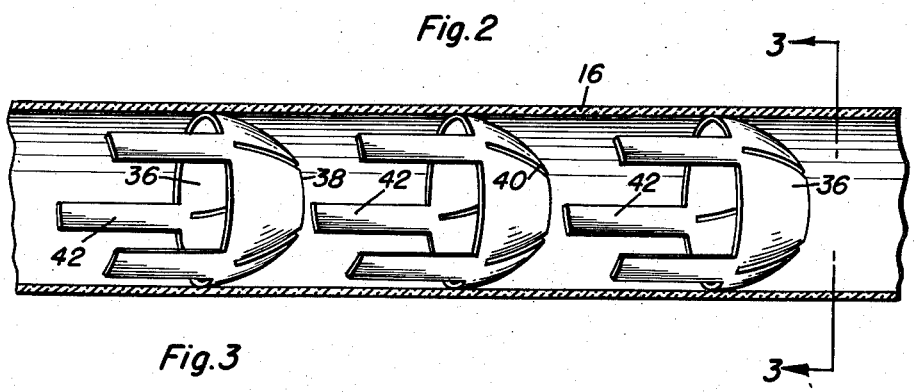
Figure 2 is a fragmentary longitudinal sectional view of one of the tubes of the heat absorber; and, Figure 3 is a transverse sectional view of one of the tubes taken on the plane 3—3 of Figure 2.
Figure 3:
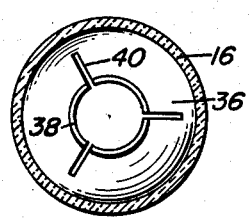

The heat absorber 12 includes a continuous tube 16, of a diathermanous material such as clear plastic or glass formed in a spiral or in the form of multiple concentric spirals, as is clearly shown in Figure 1. One end of the tube 16 is connected, as by the elbow 18 to the conduit 20 which extends through the wall 22 of a building, the conduit 22 being otherwise connected to a conventional fluid pump 24. The other end of the tube 16 is connected as by the elbow 26 to a conduit 28 which also extends through the wall 22 of the building. The conduit 28 and the conduit 30, which is communicated with the pump 24, are connected to opposite ends of the coil 32 which is disposed in the tank 34 of the heat exchanger 14.

A plurality of hemispherical shells 36, truncated as at 38, to provide a central opening, are disposed within the tube 16, the shells being of a diameter equal to internal diameter of the tube. It is intended that these shells 36 be formed of any suitable material, and coated if desired, to provide a radiant heat absorbing body having a high coefficient of absorptivity, particularly for the shorter wavelengths of the sun's spectrum which are not readily absorbed by the transparent tube 16 and cooling fluid which flows therethrough.

Each of the shell members are provided with radially extending slots 40 which communicate with the truncated end of the shells, and which slots serve to diffuse the heat absorbing fluid which passes therethrough to prevent the formation of concentric cores of fluid of different temperatures in the tube and thereby increase the cooling effect on the shells. The importance of cooling the entire surface of the shells will be best appreciated, when it is considered that the transfer of energy between two bodies such as the sun and the heat absorber is a function of the difference in the temperatures of the two bodies, and that by reducing the temperature of the heat absorbing shells, the amount of re-radiation is lowered.

The shells 36 are also provided with a plurality of resilient fingers 42 which extend from the periphery of the major end of the shells 36 and engage the inner surface of the tube 16 to retain the shells in a predetermined position therein. Obviously, the arms 42 may also constitute part of the heat absorbing shells, and accordingly may be formed of any suitable heat absorbing material, suitably coated, if desired.

Since the tube 16 is in the form of one or more spirals, and as each of the members or shells 36 are hemispherical, it will be appreciated that substantially all of the shells which have a portion of the inner or outer surface thereof exposed to the sun's rays will also have a portion of the surface thereof normal to the sun's rays, and consequently reflection from the shells is materially reduced. Further, it may be noted that the shells 36 may be so positioned that the total unshaded area of all of the shells is substantially equal to that of a black body tube of equal diameter, and therefore, it will be appreciated that the reflected solar energy may be reduced without changing the unshaded heat absorbing surface.

As glass and water are comparatively good absorbers of only the longer wave length infra-red radiation, it will be appreciated that the tube 16 and heat absorbing fluid such as water, absorb some of the solar radiations. Further, since reradiation from most bodies at low temperatures, is predominantly in the longer wave-lengths, the water and tube serve to absorb much of the re-radiated energy from the shells 36.

Having described the invention, what is claimed as new is:

1. In a solar heat absorber having a tube of diathermic material containing a radiant energy absorbing fluid, a plurality of cup shaped radiant heat absorbing members having an axial opening disposed in said tube in axial alignment therewith, each of said members being longitudinally spaced from each other with the concave face of each member registering with the convex face of the adjacent member, the fluid to be heated being passed through said tube and through the openings in said members, a plurality of circumferentially spaced arms extending from the edge of each cup member and yieldingly engaging the inner surface of said tube to retain said members in a predetermined position therein.

2. A solar heat absorber comprising a tube composed of diathermic material, a plurality of truncated hemispherical shells of radiant heat absorbing material disposed in said tube in axial alignment therewith, each of said shells being spaced from each other with the concave face of one shell in registry with the convex face of the next adjacent shell, the fluid to be heated being passed through said tube and shells, said fluid flowing in a direction to pass from the base to the truncated ends of said shells.

3. The combination of claim 2, wherein said tube is in the form of a spiral.

4. A solar heat absorber comprising a tube of diathermic material, a plurality of truncated hemispherical shells of radiant heat absorbing material disposed in said tube in axial alignment therewith, each of said shells being spaced from each other with the concave face of each shell in registry with the convex face of the next adjacent shell, the fluid to be heated being passed through said tube and shells, said fluid flowing through said shells from the base to the truncated end thereof, said shells having radially disposed slots therein to diffuse said fluid as it flows through said tube.

5. In a solar heat absorber having a tube of diathermic material, a heat absorbing fluid in said tube and means for circulating said fluid, radiant heat absorbing bodies in said tube, each of said bodies comprising a hollow truncated hemisphere of a material having a high coefficient of absorptivity for the shorter wave lengths of the sun's spectrum, a plurality of radially extending slots communicating with the truncated ends of the bodies and resilient fingers on said bodies retaining said bodies in predetermined position in said tube.

6. In a solar heat absorber having a tube of diathermic material and a radiant energy absorbing fluid flowing through the tube, a plurality of cup-shaped radiant energy absorbing members disposed in said tube, each of said members having an axial opening therein, outwardly extending slots communicating with said opening to diffuse the fluid as it flows through said members, said members being longitudinally spaced from each other in said tube, said members having an outer diameter substantially equal to the internal diameter of said tube, resilient fingers maintaining said members in a predetermined position in said tube.

MORTIMER H. MOSELEY.

REFERENCES CITED

The following references are of record in the file of this patent:

UNITED STATES PATENTS

| Number | Name | Date |
| --- | --- | --- |
| 290,851 | Calver | Dec. 25, 1883 |
| 373,564 | Meeze | Nov. 22, 1887 |
| 1,575,309 | Anderson | Mar. 2, 1926 |
| 2,107,031 | Evans | Feb. 1, 1938 |
| 2,161,887 | Ramsaur | June 13, 1939 |
| 2,386,159 | Elder | Oct. 2, 1945 |
| 2,424,612 | Gunter | July 29, 1947 |
| 2,480,706 | Brinen | Aug. 30, 1949 |
| 2,488,615 | Arnold | Nov. 22, 1949 |